United States Patent
Wu et al.

(10) Patent No.: US 12,339,801 B2
(45) Date of Patent: Jun. 24, 2025

(54) ADAPTER AND DATA TRANSMISSION METHOD UNDER LIMITED MEMORY

(71) Applicant: REALTEK SEMICONDUCTOR CORPORATION, Hsinchu (TW)

(72) Inventors: Chi Rung Wu, Hsinchu County (TW); Sung Kao Liu, Hsinchu County (TW); Cheng Yuan Hsiao, Hsinchu County (TW); Chien Min Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 46 days.

(21) Appl. No.: 18/538,815

(22) Filed: Dec. 13, 2023

(65) Prior Publication Data

US 2024/0211421 A1    Jun. 27, 2024

(30) Foreign Application Priority Data

Dec. 22, 2022  (TW) .................................. 111149565

(51) Int. Cl.
  *G06F 13/38*  (2006.01)
  *G06F 13/28*  (2006.01)
(52) U.S. Cl.
  CPC ............ *G06F 13/385* (2013.01); *G06F 13/28* (2013.01)
(58) Field of Classification Search
  None
  See application file for complete search history.

(56) References Cited

U.S. PATENT DOCUMENTS 5,721,955 A    2/1998  Cedros et al.
5,875,299 A *  2/1999  Ooe ........................ G06F 3/061
                                                      710/1

(Continued)

FOREIGN PATENT DOCUMENTS

TW        I700590 B    8/2020

OTHER PUBLICATIONS

TIPO's Office action for TWI700590B dated Mar. 31, 2023.
English summary of TIPO's Office action for TWI700590B dated Mar. 31, 2023.

*Primary Examiner* — Henry Tsai
*Assistant Examiner* — Aurangzeb Hassan
(74) *Attorney, Agent, or Firm* — WPAT, P.C.; Anthony King

(57) ABSTRACT

The present application discloses an adapter for data transmission between a first communication device and a second communication device, in which the first communication device reads data in the second communication device, and the data includes a plurality of data segments, wherein a size of each data segment is the maximum transmission unit of the second communication device. The adapter includes a buffer and a plurality of counters. The buffer stores the data transmitted by the second communication device temporarily. The plurality of counters are initially set to zero. Each counter corresponds to each data segment and indicates a size of partial data of each data segment that has been stored. The adapter transmits the partial data to the first communication device, when each counter indicates that the size of the partial data reaches a predetermined transmission unit but does not reach the maximum transmission unit.

20 Claims, 2 Drawing Sheets

(56) References Cited

U.S. PATENT DOCUMENTS

| | | | |
|---|---|---|---|
| 7,206,919 B2 * | 4/2007 | Goel | G06F 30/34 |
| | | | 711/100 |
| 8,775,687 B1 * | 7/2014 | Liu | G06F 3/0613 |
| | | | 710/5 |
| 9,836,230 B2 * | 12/2017 | Balachandran | G06F 11/1469 |
| 2021/0248098 A1 * | 8/2021 | Khandelwal | H04L 47/76 |
| 2022/0171446 A1 * | 6/2022 | Chang | G06F 1/3203 |

* cited by examiner

ADAPTER AND DATA TRANSMISSION METHOD UNDER LIMITED MEMORY

CROSS-REFERENCE TO RELATED APPLICATIONS

This application claims priority of Taiwan application No. 111149565 filed on Dec. 22, 2022, which is incorporated by reference in its entirety.

TECHNICAL FIELD

The present application relates to an adapter and a data transfer method, and particularly to an adapter for handling data transfer between two communication devices under limited memory and to a method for handling data transfer between two communication devices under limited memory.

BACKGROUND

Communication devices having different protocol interfaces need an adapter to perform data transfer therebetween. When the memory capacity of the buffer in the adapter for temporarily storing data is smaller than the size of the data that the communication device wants to transfer to the other communication device, the data needs to be written to the buffer in segments before it can be transferred to the other communication device. However, the current adapters only transmit the data to the other communication device after a complete segmented data is written in the buffer, and thus the data stays in the buffer for too long, resulting in lower data transfer performance. Therefore, how to improve the performance of data transfer by the adapters is an issue to be addressed in this field.

SUMMARY OF THE INVENTION

The present disclosure provides an adapter and data transfer method for improving the performance of data transfer between communication devices.

The present disclosure provides an adapter, for data transmission between a first communication device and a second communication device, wherein the first communication device is configured to read data in the second communication device, and the data comprises a plurality of data segments, and a size of each data segment is a maximum transmission unit of the second communication device. The adapter comprises a buffer and a plurality of counters. The buffer is configured to temporarily store the data transmitted by the second communication device. The plurality of counters are initially set to zero. Each counter corresponds to each data segment and is configured to indicate a size of partial data of each data segment that has been stored to the buffer, so as to determine whether the size of the partial data reaches a predetermined transmission unit, wherein the predetermined transmission unit is smaller than the maximum transmission unit of the second communication device. When each counter indicates that the size of the partial data of each data segment that has been stored to the buffer reaches the predetermined transmission unit and does not reach the maximum transmission unit, the adapter transmits the partial data to the first communication device.

The disclosure further provides an adapter, for data transmission between a first communication device and a second communication device, wherein the first communication device is configured to write data into the second communication device, and the data comprises a plurality of data segments, wherein a size of each data segment is a maximum transmission unit of the second communication device. The adapter comprises a buffer and a plurality of counters. The buffer is configured to temporarily store the data transmitted by the first communication device. The plurality of counters are initially set to zero. Each counter corresponds to each data segment and is configured to indicate a size of partial data of each data segment that has been stored, so as to determine whether the size of the partial data reaches a predetermined transmission unit, wherein the predetermined transmission unit is smaller than the maximum transmission unit of the second communication device. When each counter indicates that the size of the partial data of each data segment that has been stored reaches the predetermined transmission unit and does not reach the maximum transmission unit, the adapter writes the partial data into the second communication device.

The disclosure further provides a method for data transmission for use in an adapter, wherein the adapter is disposed between a first communication device and a second communication device, wherein the first communication device is configured to read a data in the second communication device, and the data comprises a plurality of data segments, wherein a size of each data segment is a maximum transmission unit of the second communication device; the adapter comprises a buffer and a plurality of counters; wherein the buffer is configured to temporarily store the data transmitted by the second communication device; and each counter corresponds to each data segment and is configured to indicates a size of a partial data of each data segment that has been stored to the buffer, so as to determine whether the size of the partial data reaches a predetermined transmission unit, wherein the predetermined transmission unit is smaller than the maximum transmission unit of the second communication device. The method comprises setting the plurality of counters to zero; receiving each data segment from the second communication device; and transmitting the partial data to the first communication device when each counter indicates that the size of the partial data of each data segment that has been stored reaches the predetermined transmission unit and does not reach the maximum transmission unit.

The adapter and data transfer method according to the present disclosure can effectively reduce the time that the data written into the buffer stays in the buffer and thus improve the performance of the overall communication system in performing data transfer.

BRIEF DESCRIPTION OF THE DRAWINGS

The following detailed description will be discussed with reference to the accompanying drawings, which are briefly described below.

DETAILED DESCRIPTION

Communication devices with different protocol interfaces may communicate with each other (e.g., transmit or receive data) via an adapter. Generally, an adapter receives data from one communication device (i.e., the transmitting terminal), stores the data temporarily in a buffer within the adapter, and then transmits the data to another communication device (i.e., the receiving terminal) to complete the communication operation of data transmission. When the storage space of the buffer is smaller than the size of the data to be transmitted by the transmitter, the data must be written to the buffer in segments.

In some embodiments, the size of the data being segmented is the maximum transmission unit of the transmitting terminal. The transmitting terminal only replies with a data transfer done message to the adapter after the complete segmented data is transmitted, and only then does the adapter that receives the data transfer done message transmit the segmented data to the receiving terminal. However, if the protocol on the transmitting terminal allows data to be transmitted out of order (e.g., allowing the transmitting terminal to send another data segment to the adapter even if a data segment has not been fully transmitted to the adapter), multiple incomplete data segments waiting for the data transfer done message may be temporarily stored in the adapter. If the data segment written to the adapter earlier has not been fully received, then a segment data written to the adapter later cannot be transmitted to the receiving terminal even though it has been fully received. The above situation causes the buffer storage space to be occupied by multiple incomplete data segments, which further reduces the data transfer performance and the adapter's storage space utilization. In order to further reduce the average time that the incomplete data segment is temporarily stored in the buffer, the present disclosure also proposes other embodiments, as discussed below.

Figure 1:
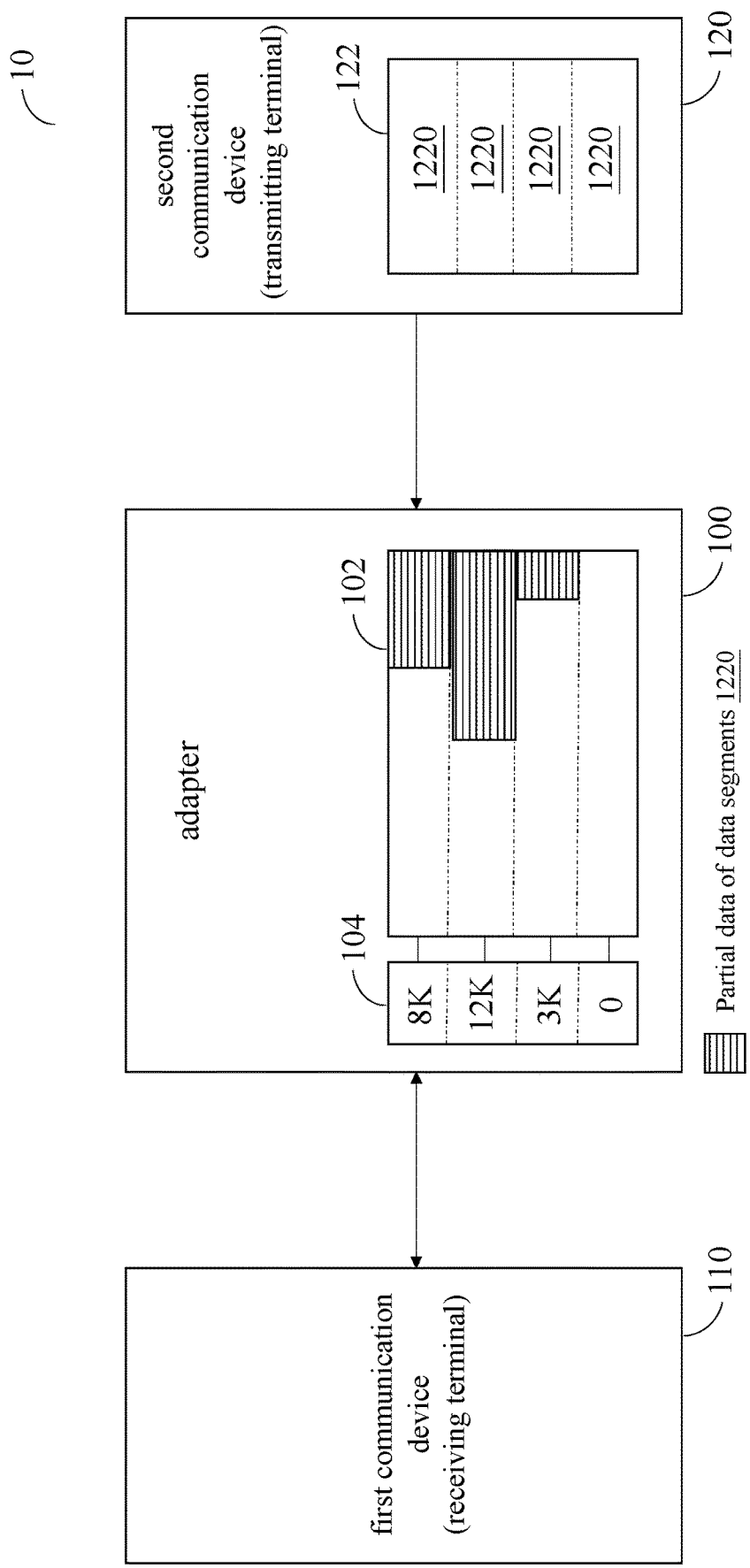
FIG. 1 is a schematic diagram illustrating a communication system according to one embodiment of the present disclosure.

FIG. 1 is a schematic diagram illustrating a communication system 10 according to one embodiment of the present disclosure. In FIG. 1, the communication system 10 includes an adapter 100, a first communication device 110 and a second communication device 120. The adapter 100 is coupled between the first communication device 110 and the second communication device 120 and configured to process the data transmission between the first communication device 110 and the second communication device 120. In the communication system 10, the first communication device 110 is configured to read the data 122 in the second communication device 120, and the second communication device 120 is configured to transmit the data 122 to the first communication device 110. In this case, the transmitting terminal of the communication system 10 is the second communication device 120, whereas the receiving terminal is the first communication device 110.

The data 122 includes (for example, may be segmented into) a plurality of data segments 1220, and the size of each data segment is the maximum transmission unit of the transmission interface of the second communication device 120. The second communication device 120 transmits the data 122 to the first communication device 110 via the adapter 100. For example, if the size of the data 122 is 512K bytes, and the maximum transmission unit of the transmission interface of the second communication device 120 is 64K bytes, then the data 122 includes (for example, can be segmented into) 8 data segments 1220.

The adapter 100 includes a buffer 102 and a plurality of counters 104. The buffer 102 is configured to temporarily store the data 122 transmitted by the second communication device 120. The buffer 102 may assign the storage space to a plurality of data segments 1220 according to the maximum transmission unit of the second communication device 120. For example, if the size of the storage space of the buffer 102 is 256K bytes, the maximum transmission unit of the transmission interface of the second communication device 120 is 64K bytes, then the buffer 102 may assign the storage space to 4 data segments. Generally, the size of the data 122 transmitted by the second communication device 120 is greater than the maximum transmission unit of the transmission interface of the second communication device 120, and hence, the data 122 is written into the buffer 102 in segments; and the size of the data 122 is greater than the storage space of the buffer 102, and thus, the buffer 102 must be reused to allow the data 122 to be completely transmitted.

When the second communication device 120 completes transmitting each data segment 1220 to the adapter 100, the adapter 100 receives a data transfer done message corresponding to each data segment 1220 from the second communication device 120. In other words, the second communication device 120 uses the data transfer done message to inform the adapter 100 that each data segment 1220 has been transmitted completely. According to the present embodiment, a portion of the data segment 1220 that has entered the buffer 102 may be transmitted to the receiving terminal (i.e., the first communication device 110) before the data segment 1220 has entered the buffer 102 in full (e.g., the 64K bytes has not yet entered the buffer 102 in full; that is, the adapter 100 has not yet received the data transfer done message). For example, if the size of the partial data of the data segment 1220 that has entered the buffer 102 is greater than a predetermined transmission unit, the partial data having the size of the predetermined transmission unit is transmitted to the receiving terminal early.

The plurality of counters 104 are initially set to zero, wherein each counter 104 corresponds to each data segment 1220 and is configured to indicate the size of the partial data of each data segment 1220 that has been stored to the buffer 102, so as to determine whether the size of the partial data reaches a predetermined transmission unit, wherein the predetermined transmission unit is smaller than the maximum transmission unit of the second communication device 120. In other words, during the period that each data segment 1220 is being written into the buffer 102, each counter 104 can indicate, in real time, the size of partial data of each data segment 1220 that has been stored to the buffer 102 currently, so as to determine whether its size has reached the predetermined transmission unit.

For example, the plurality of counters 104 of the communication system 10 shown in FIG. 1 includes four counters, corresponding to four different storage spaces of the buffer 102, respectively. The first counter indicates that the size of a partial data of its corresponding data segment 1220 that has been received by the buffer 102 is 8K bytes, the second counter indicates the size of a partial data of its corresponding data segment 1220 that has been received by the buffer 102 is 12K bytes, the third counter indicates the size of a partial data of its corresponding data segment 1220 that has been received by the buffer 102 is 3K bytes, and the fourth counter indicates that the buffer 102 has not yet received any partial data from its corresponding data segment 1220.

When each counter 104 indicates that the size of the partial data of each data segment 1220 that has been stored reaches the predetermined transmission unit and does not reach the maximum transmission unit, the adapter 100 transmits the partial data to the first communication device 110. In other words, the current adapter has to wait until it receives a data transfer done message from the transmitting terminal receives to know that the data segment has been transmitted in full, and then transmits the data segment to the receiving terminal. On the other hand, the adapter 100 according to the present disclosure can determine whether to transmit the partial data in advance according to the size of the partial data of each data segment 1220 that has been received, as indicated by each counter 104. When each counter 104 indicates the size of the partial data of each data segment 1220 that has been received has reached the predetermined transmission unit and does not reach the maximum transmission unit, the adapter 100 transmits the partial data to the first communication device 110. In other words, the adapter 100 is not required to wait until the second communication device 120 transmits the data transfer done message (which indicates that data segment 1220 has been transmitted in full), but may instead transmit the partial data of each data segment 1220 to the first communication device 110 in advance before each data segment 1220 is written into the buffer 102 in full, thereby preventing the partial data of each data segment 1220 from staying in the buffer 102 for too long, which in turn increases the utilization efficiency of the buffer 102.

For example, it is assumed that the maximum transmission unit of the transmission interface of the second communication device 120 is 64K bytes, the size of the predetermined transmission unit is 4K bytes. When the second communication device 120 completes transmitting at least 4K bytes of partial data to the buffer 102, each counter 104 indicates that the size of the partial data has reached the predetermined transmission unit (4K bytes) and does not reach the maximum transmission unit (64K bytes). In this case, the adapter 100 may transmit the partial data to the first communication device 110 without the need to transmit the full data segment 1220 to the first communication device 110 until after a data transfer done message is received from the second communication device 120. More specifically, the transmission of each partial data may save the time of waiting for the second communication device 120 to reply the data transfer done message to the adapter 100, so that the next partial data can be transmitted to the first communication device 110 earlier. Thus, the adapter 100 of the present disclosure can effectively improve the efficiency of data transmission.

Take the communication system 10 shown in FIG. 1 as an example: the first counter and the second counter indicate that the size of the partial data of its corresponding data segments 1220 that has been received by the buffer 102 has reached (exceeded) the predetermined transmission unit (4K bytes), and thus, the adapter 100 may transmit partial data of the data segments 1220 corresponding to the first counter and the second counter to the first communication device 110; in contrast, since the third counter indicates that the size of the partial data of its corresponding data segment 1220 that has been received by the buffer 102 has not yet reached (exceeded) the predetermined transmission unit (4K bytes), the adapter 100 does not transmit the partial data of the data segment 1220 corresponding to the third counter to the first communication device 110 for the time being.

After transmitting the partial data to the first communication device 110, the adapter 100 resets each counter 104 corresponding to the data segment 1220 to zero, and the adapter 100 deletes the partial data stored in the buffer 102. In other words, after the adapter 100 transmits the partial data to the first communication device 110, the partial data temporarily stored in the buffer 102 may be deleted so as to release the storage space of the buffer 102 for the partial data to be written in subsequently, and each corresponding counter 104 is reset to zero because the partial data has been deleted.

After the first communication device 110 completes receiving all the data 122 from the adapter 100, if the data 122 is correct, the first communication device 110 transmits a success indication message to the adapter 100, to ensure the accuracy of the data 122 transmitted by the second communication device 120. In contrast, after the first communication device 110 completes receiving all the data 122 from the adapter 100, if there is an error of the transmission of the data 122 so that the data 122 is incorrect, the first communication device 110 transmits a failure indication message to the adapter 100, so as to inform the adapter 100 that there is an error of the transmission of the data 122. After receiving the failure indication message, the adapter 100 requests the second communication device 120 to retransmit the data 122.

Figure 2:
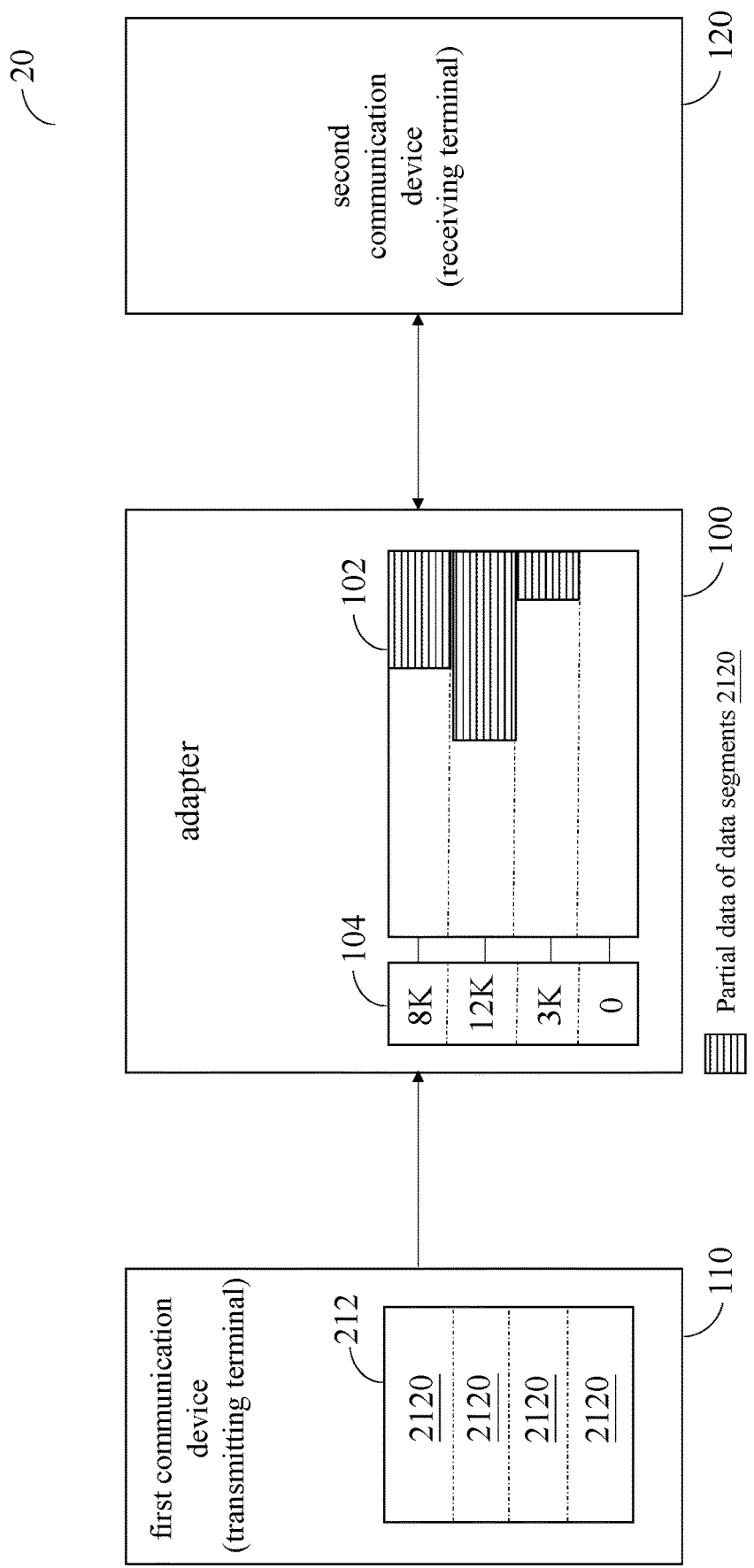
FIG. 2 is a schematic diagram illustrating a communication system according to one embodiment of the present disclosure.

FIG. 2 is a schematic diagram illustrating a communication system 20 according to one embodiment of the present disclosure. The framework of the communication system 20 is the same as that of the communication system 10, with the exception that in the communication system 20, the first communication device 110 is configured to write the data 212 into the second communication device 120, and the first communication device 110 is configured to transmit the data 212 to the second communication device 120. In this case, the transmitting terminal of the communication system 20 is the first communication device 110, and the receiving terminal is the second communication device 120.

The data 212 includes (e.g., may be segmented into) a plurality of data segments 2120, wherein the size of each data segment 2120 is the maximum transmission unit of the transmission interface of the second communication device 120. Regarding the technical features of the data 212, reference may be made to the above description and examples of the data 122, and details thereof are not repeated here.

The technical features and communication operations of each component in the communication system 10 can be applied to the corresponding components in the communication system 20, and will not be repeated here. Generally speaking, the size of the data 212 transmitted by the first communication device 110 is greater than the maximum transmission unit of the transmission interface of the second communication device 120, so the data 212 needs to be written into the buffer 102 in segments; and the size of the data 212 is greater than the storage space of the buffer 102, and thus, the buffer 102 must be reused to allow the data 212 to be completely transmitted.

After the first communication device 110 completes transmitting the data 212 to the adapter 100, if the data 212 is correct, the first communication device 110 transmits a success indication message to the adapter 100, to ensure the accuracy of the data 212 transmitted by the first communication device 110. In contrast, after the first communication device 210 completes transmitting all the data 212 from the adapter 100, if the data 212 is incorrect, the first communication device 210 transmits a failure indication message to the adapter 100. After receiving the failure indication message, the adapter 100 requests the first communication device 210 to retransmit the data 212.

When the adapter 100 completes writing each data segment 2120 to the second communication device 120, the adapter 100 receives a data transfer done message from the second communication device 120. In other words, the second communication device 120 informs the adapter 100 that each data segment 2120 has been written into the second communication device 120 in full via the data transfer done message.

In summary, the adapter of the present disclosure can transmit part of the data that has been written into the adapter to the receiving terminal in advance when the data segment has not been received from the transmitting terminal in full. This data transmission method can effectively reduce the time that data stays in the buffer, so as to improve the overall data transmission performance of the communication system, especially when the second communication device 120 is a slow communication device, the improvement in the overall data transmission performance of the communication system is even more significant, compared to the existing communication system.

What is claimed is:

1. An adapter, for data transmission between a first communication device and a second communication device, wherein the first communication device is configured to read data in the second communication device, and the data comprises a plurality of data segments, and a size of each data segment is a maximum transmission unit of the second communication device, the adapter comprising:
   a buffer, configured to temporarily store the data transmitted by the second communication device; and
   a plurality of counters, initially set to zero, wherein each counter corresponds to each data segment and is configured to indicate a size of partial data of each data segment that has been stored to the buffer, so as to determine whether the size of the partial data reaches a predetermined transmission unit, wherein the predetermined transmission unit is smaller than the maximum transmission unit of the second communication device;
   wherein:
   when each counter indicates that the size of the partial data of each data segment that has been stored to the buffer reaches the predetermined transmission unit and does not reach the maximum transmission unit, the adapter transmits the partial data to the first communication device.

2. The adapter of claim 1, wherein after transmitting the partial data to the first communication device, the adapter resets each counter corresponding to each data segment to zero.

3. The adapter of claim 2, wherein the adapter deletes the partial data stored in the buffer.

4. The adapter of claim 1, wherein after the first communication device completes receiving all the data from the adapter, if the data is correct, the first communication device transmits a success indication message to the adapter.

5. The adapter of claim 1, wherein after the first communication device completes receiving all the data from the adapter, if the data is incorrect, the first communication device transmits a failure indication message to the adapter.

6. The adapter of claim 5, wherein after receiving the failure indication message, the adapter requests the second communication device to retransmit the data.

7. The adapter of claim 1, wherein when the second communication device completes transmitting each data segment to the adapter, the adapter receives a data transfer done message corresponding to each data segment from the second communication device.

8. The adapter of claim 1, wherein a size of the data is greater than the maximum transmission unit of the second communication device and is greater than a storage space of the buffer.

9. An adapter, for data transmission between a first communication device and a second communication device, wherein the first communication device is configured to write data into the second communication device, and the data comprises a plurality of data segments, wherein a size of each data segment is a maximum transmission unit of the second communication device, the adapter comprising:
   a buffer, configured to temporarily store the data transmitted by the first communication device; and
   a plurality of counters, initially set to zero, wherein each counter corresponds to each data segment and is configured to indicate a size of partial data of each data segment that has been stored, so as to determine whether the size of the partial data reaches a predetermined transmission unit, wherein the predetermined transmission unit is smaller than the maximum transmission unit of the second communication device;
   wherein:
   when each counter indicates that the size of the partial data of each data segment that has been stored reaches the predetermined transmission unit and does not reach the maximum transmission unit, the adapter writes the partial data into the second communication device.

10. The adapter of claim 9, wherein after writing the partial data into the second communication device, the adapter resets each counter corresponding to each data segment to zero.

11. The adapter of claim 10, wherein the adapter deletes the partial data stored in the buffer.

12. The adapter of claim 9, wherein after the first communication device completes transmitting the data to the adapter, if the data is correct, the first communication device transmits a success indication message to the adapter.

13. The adapter of claim 9, wherein after the first communication device completes transmitting the data to the adapter, if the data is incorrect, the first communication device transmits a failure indication message to the adapter.

14. The adapter of claim 13, wherein after receiving the failure indication message, the adapter requests the first communication device to retransmit the data.

15. The adapter of claim 9, wherein when the adapter completes writing each data segment into the second communication device, the adapter receives a data transfer done message from the second communication device.

16. The adapter of claim 9, wherein the size of the data is greater than the maximum transmission unit of the second communication device and is greater than the storage space of the buffer.

17. A method for data transmission for use in an adapter, wherein the adapter is disposed between a first communication device and a second communication device, wherein the first communication device is configured to read a data in the second communication device, and the data comprises a plurality of data segments, wherein a size of each data segment is a maximum transmission unit of the second communication device; the adapter comprises a buffer and a plurality of counters; wherein the buffer is configured to temporarily store the data transmitted by the second communication device; and each counter corresponds to each data segment and is configured to indicates a size of a partial data of each data segment that has been stored to the buffer, so as to determine whether the size of the partial data reaches a predetermined transmission unit, wherein the predetermined transmission unit is smaller than the maximum transmission unit of the second communication device; the method comprising:
   setting the plurality of counters to zero;
   receiving each data segment from the second communication device; and
   transmitting the partial data to the first communication device when each counter indicates that the size of the partial data of each data segment that has been stored reaches the predetermined transmission unit and does not reach the maximum transmission unit.

18. The method of claim 17, further comprising:
resetting each counter corresponding to each data segment to zero, and to delete the partial data stored in the buffer, after transmitting the partial data to the first communication device.

19. The method of claim 17, further comprising:
receiving a success indication message from the first communication device, after transmitting all the partial data to the first communication device, if the data is correct.

20. The method of claim 17, further comprising:
receiving a failure indication message from the first communication device and requesting the second communication device to retransmit the data, after transmitting all the partial data to the first communication device, if the data incorrect.

* * * * *